(12) United States Patent
Hotaling et al.

(10) Patent No.: US 6,658,678 B2
(45) Date of Patent: Dec. 9, 2003

(54) ATTACHING ARTICLES TO BED RAILINGS

(75) Inventors: Bryan R. Hotaling, Arlington, MA (US); Carl J. Conforti, Fall River, MA (US)

(73) Assignee: The First Years Inc., Lake Forest, CA (US)

( * ) Notice: Subject to any disclaimer, the term of this patent is extended or adjusted under 35 U.S.C. 154(b) by 0 days.

(21) Appl. No.: 09/909,292

(22) Filed: Jul. 19, 2001

(65) Prior Publication Data

US 2002/0048488 A1 Apr. 25, 2002

Related U.S. Application Data

(60) Provisional application No. 60/220,237, filed on Jul. 21, 2000.

(51) Int. Cl.[7] .................. A47C 21/00; A47C 31/00; A63H 33/00
(52) U.S. Cl. ................. 5/503.1; 5/658; 5/663; 446/227
(58) Field of Search ................. 5/425, 93.1, 503.1, 5/658, 97, 663, 317, 53.1; 248/447.2, 292.12, 292.13, 229.1, 231.61, 228.3, 226.11, 222.11, 214, 222.13; 446/227, 226; 403/326, 328, 329, 330, 325, 321, 410; 292/219

(56) References Cited

U.S. PATENT DOCUMENTS

| | | | | |
|---|---|---|---|---|
| 2,519,782 A | * | 8/1950 | Mueller et al. | 185/39 |
| 2,774,182 A | * | 12/1956 | Beder | 248/298.1 |
| 3,840,924 A | * | 10/1974 | Hamilton | 362/130 |
| 4,453,339 A | | 6/1984 | Cook | 446/227 |
| D278,923 S | * | 5/1985 | Anderson | D21/417 |
| 4,765,662 A | * | 8/1988 | Suska | 292/219 |
| 5,148,356 A | * | 9/1992 | Freese et al. | 362/130 |
| 5,538,303 A | * | 7/1996 | Dunham | 294/82.31 |
| 5,695,162 A | | 12/1997 | DiCastro | 248/231.81 |
| D396,717 S | * | 8/1998 | Sidman et al. | D14/162 |

* cited by examiner

Primary Examiner—Heather Shackelford
Assistant Examiner—Lisa M. Saldano
(74) Attorney, Agent, or Firm—Fish & Richardson P.C.

(57) ABSTRACT

An article adapted to be releasably attached to a bed railing, the article having a housing defining an opening for slidingly receiving a portion of the railing, when the housing is mounted on the railing. The article also has a first pawl movably connected to the housing and arranged to be moved from a retaining position, in which the pawl is adapted to block the opening to prevent removal of the railing from the opening, to a release position to enable removal of the article from the railing member. Further, the article has a spring connected to the housing and bearing against the pawl to bias the pawl towards its retaining position with respect to the housing.

27 Claims, 6 Drawing Sheets

ATTACHING ARTICLES TO BED RAILINGS

This application claims priority for provisional U.S. application No. 60/220,237 filed Jul. 21, 2000.

TECHNICAL FIELD

This invention relates to articles adapted to be releasably attached to the railings of beds such as cribs.

BACKGROUND

Beds, such as cribs or hospital beds, commonly have railings extending upward above the bed surface. Especially with cribs, it is known to attach various articles, such as for visual, aural, or play stimulation of infants, to these railings. For example, toys can be releasably attached to a crib railing. The attachment mechanism for holding an article in place on such a crib railing should preferably prevent the article from being removed from the railing by a toddler in the crib.

SUMMARY

The invention features a mechanism that can enable the article to be releasably attached to a bed railing in such a way that it is held in place until someone manually releases the article. In an aspect of the invention, an article is adapted to be releasably attached to a bed railing, the article comprising a housing defining an opening for slidingly receiving a portion of the railing when the article is mounted on the railing. It also includes a first pawl movably connected to the housing and arranged to be moved from a retaining position, in which the pawl is adapted to block the opening to prevent removal of the railing from the opening, to a release position retracted from the opening to enable removal of the article from the railing. The article also has a spring connected to the housing and bearing against the pawl to bias the pawl towards its retaining position with respect to the housing.

Embodiments of this aspect of the invention can include the following. The pawl is pivotably connected to the housing. The opening is a slot extending across the housing, and it has an open side through which the portion of the railing is slidingly received. The pawl has a surface arranged to extend into the opening between the portion of the railing and the open side of the slot, to block removal of the railing from the opening. The surface of the pawl defines a first step at a first distance from a distal closed side of the slot, and a second step at a second distance from the distal closed side of the slot, the second distance being greater than the first distance, for accommodating railing members of different sizes. The first distance is about 1.425 inches. The second distance is about 2 inches. The opening defined by the housing is arranged for receiving a generally horizontal portion of the railing. The article also includes a second pawl movably connected to the housing and spaced apart from the first pawl, with the second pawl also arranged to be moved from a retaining position in which the second pawl is adapted to block the opening to prevent removal of the railing from the opening, to a release position retracted from the opening to enable removal of the article from the railing. The first pawl and the second pawl are connected to a common side of the housing. The first and second pawls are independently movable. The first and second pawls are spaced apart a distance generally equal to or less than a spacing between two adjacent vertical crib railing portions. The distance between an outer edge of the first pawl to an outer edge of the second pawl is about 3.0–3.5 inches.

In another aspect of the invention, an article is adapted to be releasably attached to a bed railing, the article including a housing defining a slot for receiving a portion of the railing. The housing is adapted to extend below the railing when the housing is placed over the railing, and the slot has a closed side and an open side. The article also has a pawl with a first engaging surface. The pawl is connected to the housing and arranged to be moved from its first retaining position in which the pawl's first engaging surface blocks removal of the railing from the slot in a direction parallel to an axis extending between the slot's closed and open sides, to a release position to enable removal of the railing. The article also has a spring connected to the housing and bearing against the pawl to bias the pawl towards its retaining position with respect to the housing.

Embodiments of this aspect of the invention can include a pawl having a second engaging surface spaced apart from the first engaging surface for accommodating railings of different sizes. The pawl is arranged to be moved from its second retaining position, in which the second engaging surface blocks removal of the railing member from the slot, to its release position.

Advantageously, an article constructed according to the invention does not require threaded fasteners which can get lost or which can be ingested by a small child. The invention provides a railing gripping mechanism which is incorporated into the article, thereby minimizing the chances of the mechanism being misplaced. Also, the invention provides a mechanism for gripping a railing which encloses all sides of the railing, thus preventing accidental removal of the article from the railing. Further advantages of the invention include its ease of use, and its capability to be used with a wide range of railing dimensions.

The details of embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
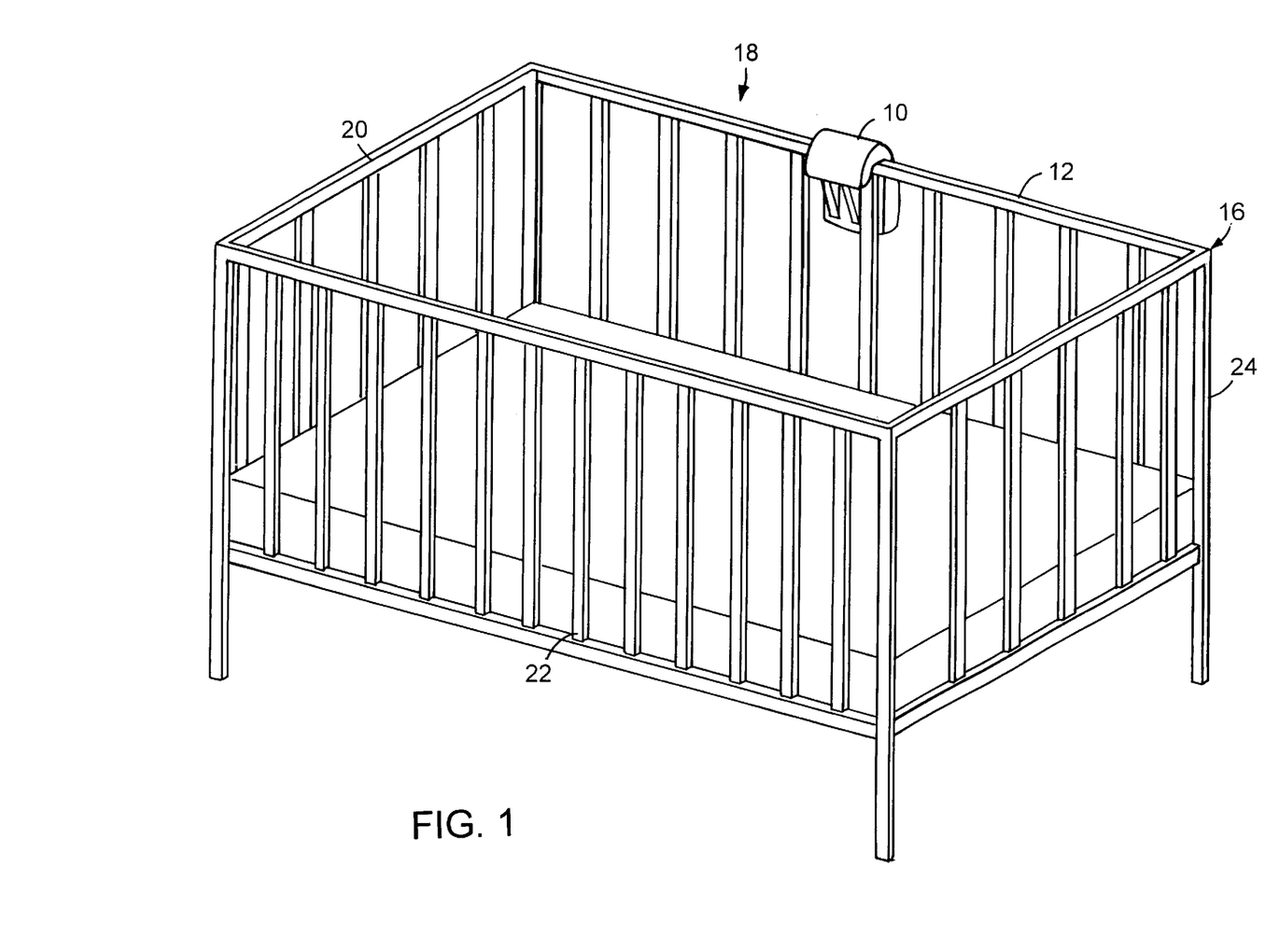
FIG. 1 is a perspective view of a CD player embodying the invention installed on a crib railing.
Figure 2:
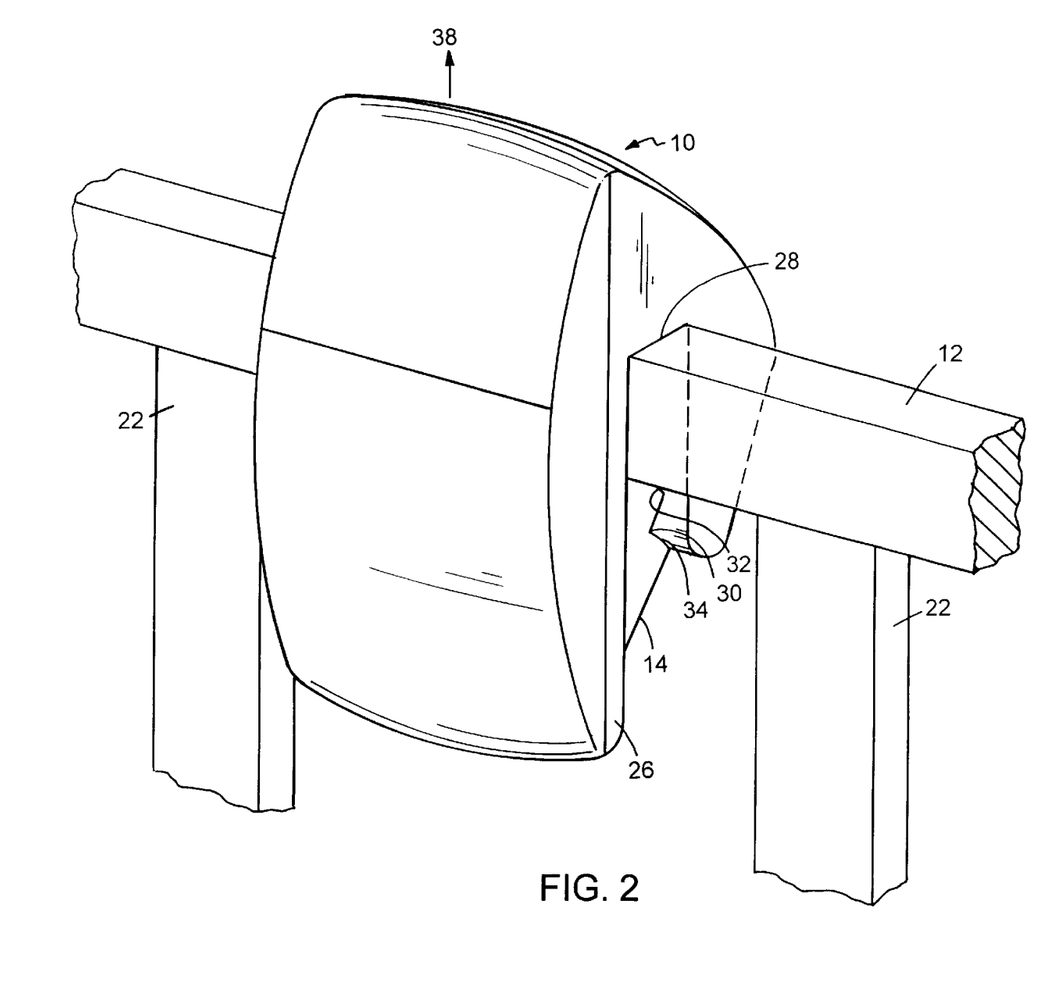
FIG. 2 is an enlarged perspective view of the opposite side of the CD player of FIG. 1.

As shown in FIGS. 1 and 2, a CD player 10 is attached to a crib railing member 12. The CD player 10 has a pawl 14 which prevents the CD player from being removed from the railing member 12 without manual displacement of the pawl 14.

In use, CD player 10 is placed over crib railing member 12, which is part of a railing 16 surrounding a child's crib 18. The railing 16 has both horizontal members 12, 20 and vertical members 22, 24. CD player 10 has a housing 26 that defines a slot 28 for receiving horizontal member 12. Housing 26 has a portion that extends below horizontal crib railing member 12 when CD player 10 is mounted on the crib railing member. Pawl 14 is releasably attached to housing 26 at its lower end, and biased outward into slot 28. Pawl 14 has a surface 30 which defines a first step 32 and a second step 34, and is shown in a retaining position in which step 32 prevents removal of railing member 12 from opening 26, such as by lifting the CD player in the direction of arrow 38.

Figure 3A:
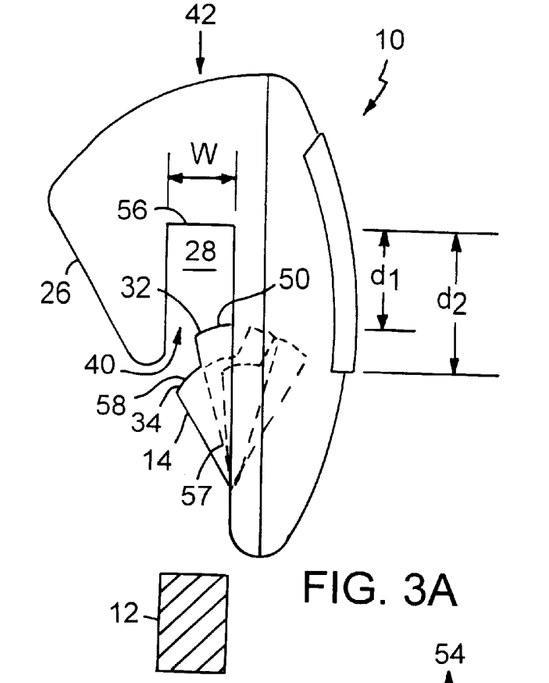
FIGS. 3A–3C sequentially illustrate the CD player being attached to a railing member.
Figure 3B:
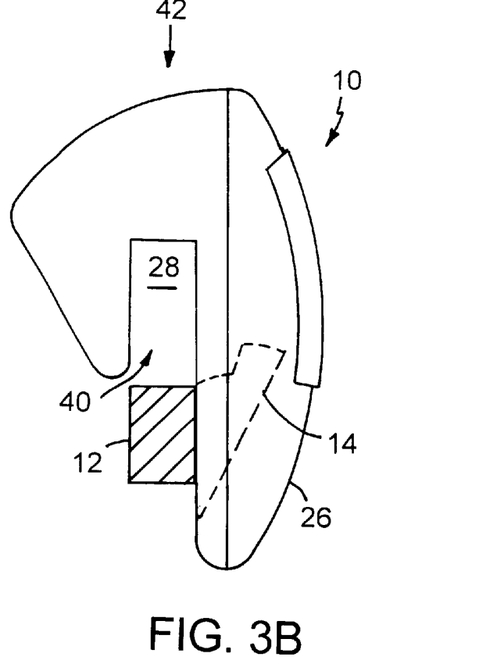
Figure 3C:
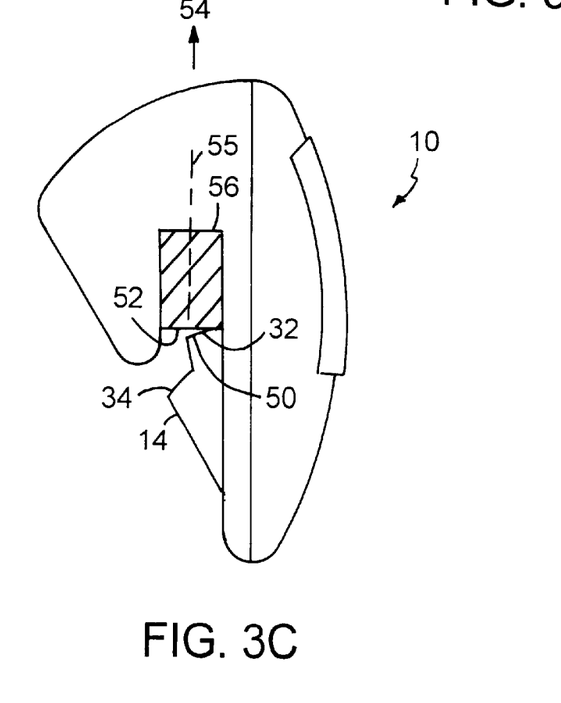

Referring to FIGS. 3A–3C, CD player 10 is mounted on railing member 12 by first positioning CD player 10 directly over railing member 12. Slot 28 extends across housing 26 and has an open side 40 for receiving railing member 12. Prior to insertion of railing member 12 into slot 28, pawl 14 is in its retaining position (FIG. 3A). As CD player 10 is lowered over railing member 12 in the direction of arrow 42, railing member 12 presses against pawl 14, retracting pawl 14 into housing 26 into a release position (FIG. 3B). Finally, slot 28 receives railing member 12, and pawl 14 returns to its retaining position (FIG. 3C). Step 32 has a surface 50 which blocks removal of CD player 10 from railing member 12 in a direction 54, which is perpendicular to railing member 12. If someone attempts, with the CD player installed over the railing as shown in FIG. 3C, to move CD player 10 in direction 54, to lift the CD player from the railing, step 32 abuts railing member 12 and blocks further movement of CD player 10.

The structure of slot 28 and pawl 14 accommodate railings of different sizes. In order to accommodate a wide range of the types and sizes of upper railing members found on infant cribs presently marketed in the United States, slot 28 preferably has an overall width "W" (FIG. 3A) of about 1.125 inches. It is not necessary that CD player 10 be restrained from small motions with respect to the crib railing, and that some play between the railing and the attached CD player is acceptable, so long as the CD player is not removable without intentional manipulation of its attachment pawls 14. To restrict the amount of vertical play between the CD player and crib railing, while still accommodating a wide variety of railing member shapes and sizes, the upper surface of pawl 14 is stepped, such that when the CD player is installed over railing members of great depth, pawl 14 extends only partially into slot 28 and step 34 provides a stop surface to prevent removal (see FIG. 4). Thus when pawl 14 is in its fully extended retaining position, surface 50 of step 32 is a vertical distance $d_1$ from distal closed side 56 of slot 28. In its partially extended position, shown in dashed outline in FIG. 3A, surface 58 of step 34 is a distance $d_2$ from distal closed side 56. For example, in one preferred embodiment, distance $d_1$ is about 1.425 inches and distance $d_2$ is about 2 inches. Slot 28 and pawl 14 thereby can accommodate railings of different sizes with an acceptable amount of play.

Figure 4:
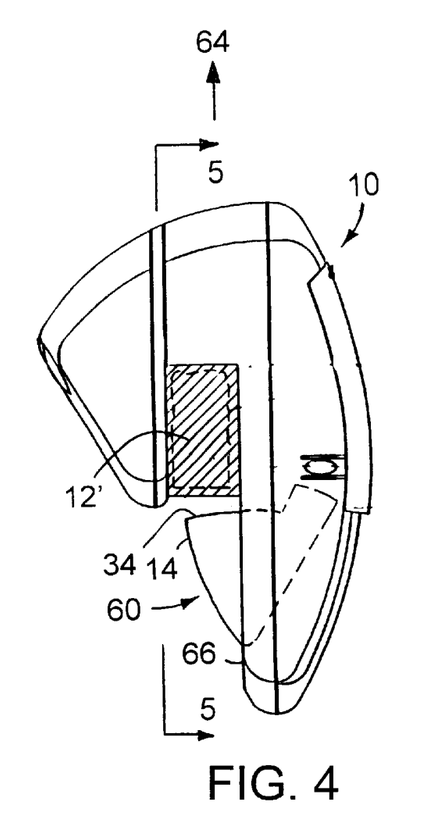
FIG. 4 illustrates manipulating the latch to enable removal of the CD player from a railing.

Referring to FIG. 4, in order to remove CD player 10 from a large railing member 12', one must first manually push pawl 14 into housing 26 along a direction indicated by arrow 60 into a release position (as shown in dashed outline with the pawl completely within housing 20). Then, one may lift CD player 10 in a direction indicated by arrow 64. When pawl 14 is in its release position, neither surface 50 nor surface 58 blocks the path for releasing railing member 12' from slot 28.

Figure 5:
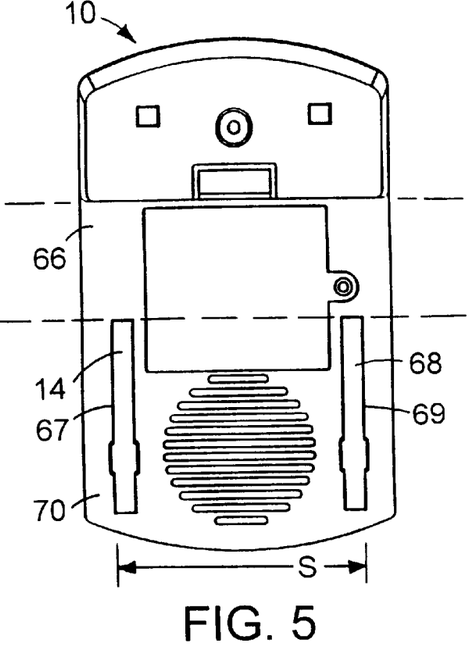
FIG. 5 is a view of the CD player, taken along line 5—5 in FIG. 4.

Referring to FIG. 5, the housing of CD player 10 has a rear housing 66 with first pawl 14 and a second pawl 68. The two pawls 14, 68 are attached to the same side 70 of rear housing 66. In use, both pawls 14, 68 are normally biased toward a retaining position to block the release of railing member 12 from slot 28. To enable the release of railing member 12 from slot 28, both pawls 14, 60 must be independently moved to their release positions. Outer edges 67, 69 of pawls 14, 68 are spaced apart, along slot 28, a nominal distance "S" of about 3.42 inches inches, to cooperate with a typical spacing between adjacent vertical railing members of crib railings, so as to provide an acceptable limit to the amount of free play of the installed CD player along the crib railing. So spaced, pawls 14, 68 are far enough apart that they would require a small child to use both hands to coordinate the release of both pawls to enable the CD player to be removed.

Figure 6:
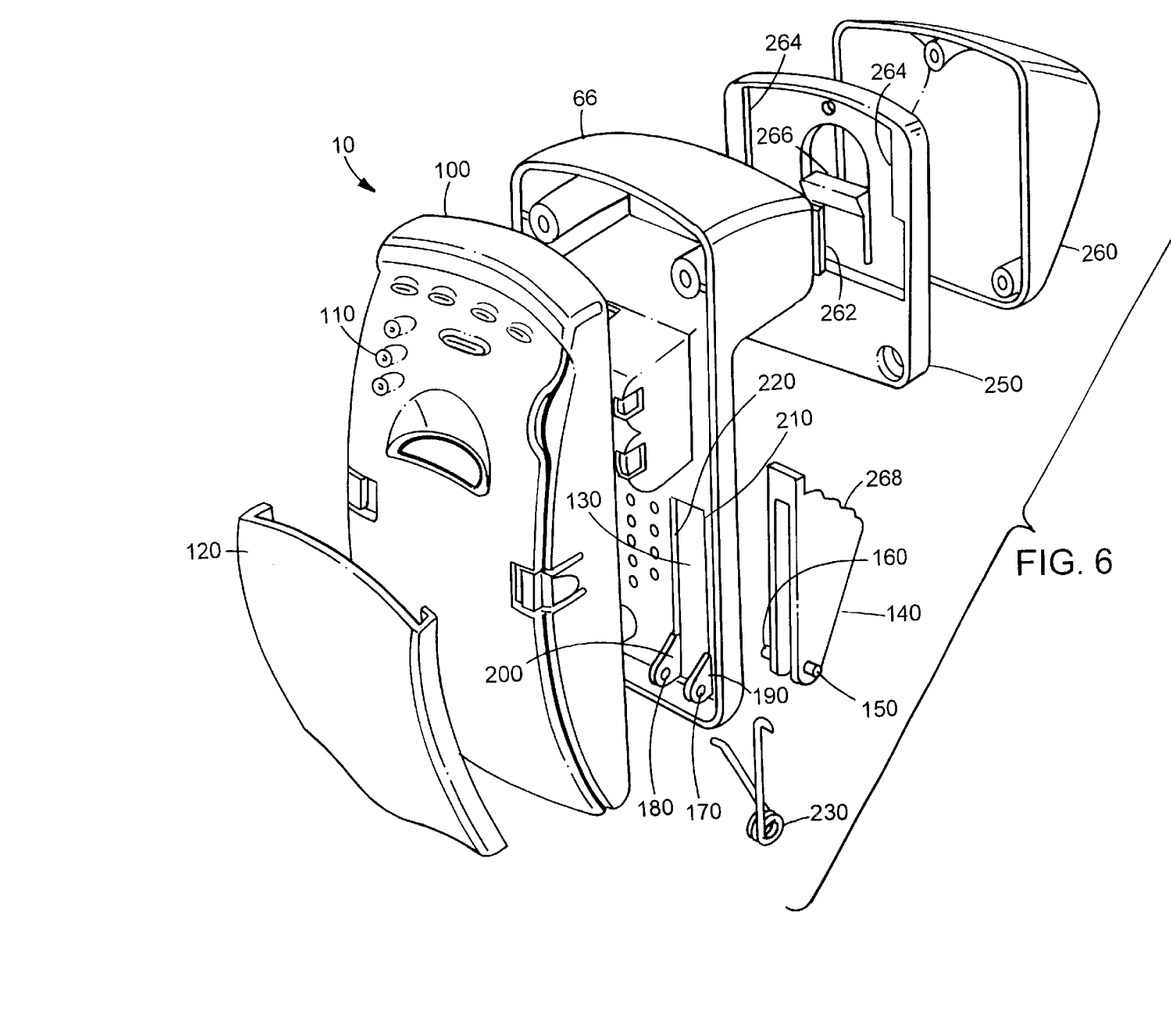
FIG. 6 is an exploded view of the housing of an alternate embodiment of a crib CD player embodying the invention.

Referring to FIG. 6, CD player 10 is constructed from a number of parts. These parts include a front housing 100 having a set of control keys 110. A CD door 120 is slidably attached to front housing 100. Front housing 100 is attached to the rear housing 66 by threaded fasteners (not shown). Rear housing 66 defines an opening 130 sized to receive a pawl 140. Pawl 140 has pins 150, 160. When CD player 10 is assembled, pins 150, 160 fit into holes 170, 180 formed in fins 190, 200, located adjacent two sides 210, 220 of opening 130. Pawl 140 is thereby pivotably mounted on rear housing 66. A spring 230 biases pawl 140 outward from rear housing 66. A light cover plate 250, which forms one side of the slot into which the railing is received, releasably attaches to rear housing 66 by sliding tabs 262 of rear housing 66 upward behind flanges 264 of cover plate 250 until spring tab 266 of cover plate 250 snaps into place beneath a cooperating feature (not shown) of rear housing 66. Before attaching cover plate 250 to rear housing 66, a light housing 260 is secured to cover plate 250 by threaded fasteners (not shown) to form a cavity for containing a night light bulb, for example. Pawl 140 is illustrated as having an upper surface 268 defining four steps for accommodating railings of different sizes.

Figure 7:
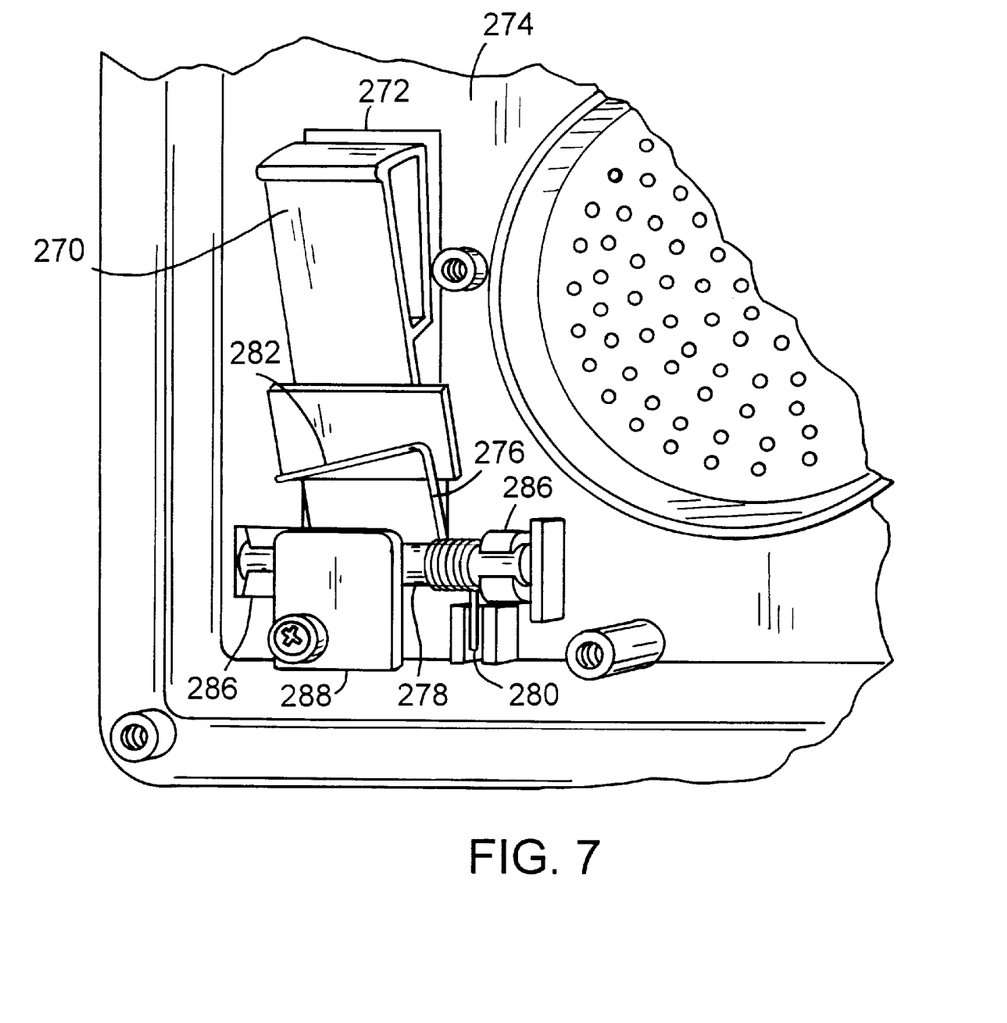
FIG. 7 is an enlarged fragmentary view illustrating an alternate latch pawl and torsional bias spring in the CD player.

FIG. 7 illustrates another pawl construction. A pawl 270 is biased outward through an opening 272 in a rear housing 274 by a torsional spring 276 disposed about a pin 278 of the pawl and having a first extension 280 that bears against the inner surface of rear housing 274, and a second extension 282 that bears against a step plate 284 of pawl 270, to bias the pawl from its retracted release position (shown) to its retaining position, in which stop plate 284 bears against the inner surface of rear housing 274. Pawl pin 278 is retained by molded clips 286 of the housing and by a plate 288.

It will be understood that various modifications may be made which are within the scope of the invention. For example, the latch mechanism which includes the pawl can be constructed for use with a railing for an adult bed, such as a hospital bed. Also, the latch mechanism may be used with toys and devices other than the described embodiment of the CD player. Accordingly, other embodiments are within the scope of the following claims.

What is claimed is:

1. A bed railing attachment comprising:
   a housing supporting a useful article to be attached to a bed railing, the housing defining an opening sized to slidingly receive an upper portion of the railing as the housing is placed over the railing;
   a first pawl pivotably connected to the housing to pivot from a retaining position, in which the pawl is positioned to block the opening to prevent removal of the railing from the opening, to a release position refracted from the opening to enable removal of the article from the railing, the pawl having a surface arranged to extend, with the pawl in its retaining position, into the opening beneath the railing and between adjacent vertical railing members, to block removal of the railing from the opening and to prevent movement of the housing along the railing; and a spring connected to the housing and bearing against the pawl to bias the pawl towards its retaining position with respect to the housing such that when the article is slid over the bed railing, the pawl is moved by the spring to its retaining position.

2. An article adapted to be releasably attached to a bed railing, said article comprising:

a housing defining a slot for receiving a portion of the railing, the housing adapted to extend below the railing portion when the housing is placed over the railing, and the slot having a closed side and an open side;

a pawl having a first engaging surface, the pawl connected to the housing and arranged to be moved from its retaining position in which the pawl's first engaging surface blocks removal of the railing from the slot in a direction parallel to an axis extending between the slot's closed and open sides, to a release position to enable removal of railing, the pawl having a surface arranged to extend into the opening between the portion of the railing and the opening side of the slot, to block removal of the railing from the opening with the pawl in its retaining position; and a spring connected to the housing and bearing against the pawl to bias the pawl towards its retaining position with respect to the housing such that when the article is slid over the bed railing, the pawl is moved by the spring to its retaining position;

wherein the pawl has a second engaging surface spaced apart from the first engaging surface for accommodating railings of different sizes, and wherein the pawl is arranged to be moved from its second retaining position, in which the second engaging surface blocks removal of the railing from the slot, to its release position.

3. The attachment of claim 1, wherein the opening is a slot extending across the housing and having an open side through which the portion of the railing is slidingly received.

4. The article of claim 2, further comprising a second pawl movably connected to the housing and spaced apart from the first pawl, the second pawl arranged to be moved from a retaining position in which the second pawl is adapted to block the opening to prevent removal of the railing from the opening, to a release position refracted from the opening to enable removal of the article from the railing.

5. The attachment of claim 3, wherein the surface of the pawl defines a first step at a first distance from a distal closed side of the slot, and a second step at a second distance from the distal closed side of the slot, said second distance being greater than said first distance, for accommodating railings of different sizes.

6. The attachment of claim 5 wherein the first distance is about 1.425 inches.

7. The attachment of claim 5 wherein the second distance is about 2 inches.

8. The attachment of claim 1, wherein the opening defined by the housing is arranged for receiving a generally horizontal portion of the railing.

9. The attachment of claim 1, further comprising a second pawl movably connected to the housing and spaced apart from the first pawl, the second pawl arranged to be moved from a retaining position in which the second pawl is adapted to block the opening to prevent removal of the railing from the opening, to a release position retracted from the opening to enable removal of the article from the railing.

10. The attachment of claim 9, wherein the first pawl and the second pawl are connected to a common side of the housing.

11. The attachment of claim 9, wherein the first and second pawls are independently movable.

12. The attachment of claim 9, wherein the first and second pawls are spaced apart a distance generally equal to or less than a spacing between two adjacent vertical crib railing portions.

13. The attachment of claim 9, wherein a distance between an outer edge of the first pawl to an outer edge of the second pawl is about 3.0–3.5 inches.

14. The attachment of claim 1, wherein the opening has a width of about 1.125 inches.

15. A bed railing attachment comprising:

a housing supporting a useful article to be attached to a bed railing, the housing defining a slot sized to slidingly receive an upper portion of the railing, the housing adapted to extend below the railing portion when the housing is placed over the railing, and the slot having a closed side and an open side;

a pawl having a first engaging surface, the pawl connected to the housing and arranged to be pivotably moved from its retaining position in which the pawl's first engaging surface blocks removal of the railing from the slot in a direction parallel to an axis extending between the slot's closed and open sides, to a release position to enable removal of railing, the pawl having a surface arranged to extend, with the pawl in its retaining position, into the opening beneath the railing and between adjacent vertical members, to block removal of the railing from the opening and to prevent movement of the housing along the railing; and a spring connected to the housing and bearing against the pawl to bias the pawl towards its retaining position with respect to the housing such that when the article is slid over the bed railing, the pawl is moved by the spring to its retaining position.

16. The attachment of claim 15, wherein the pawl has a second engaging surface spaced apart from the first engaging surface for accommodating railings of different sizes, and wherein the pawl is arranged to be moved from its second retaining position, in which the second engaging surface blocks removal of the railing from the slot, to its release position.

17. A bed railing attachment comprising:

a housing supporting a useful article to be attached to a bed railing, the housing defining an opening sized to slidingly receive an upper portion of the railing, as the housing is placed over the railing;

a first pawl pivotably connected to the housing to pivot from a retaining position, in which the pawl is adapted to block the opening to prevent removal of the railing from the opening, to a release position retracted from the opening to enable removal of the article from the railing;

a spring connected to the housing and bearing against the pawl to bias the pawl towards its retaining position with respect to the housing, such that when the article is slid over the bed railing, the first pawl is moved by the spring to its retaining position; and a second pawl pivotably connected to the housing and spaced apart from the first pawl, the second pawl to pivot from a retaining position in which the second pawl is positioned to block the opening to prevent removal of the railing from the opening with the second pawl in its retaining position, to a release position retracted from the opening to enable removal of the article from the railing, the first and second pawls being connected to a common side of the housing.

18. The attachment of claim 17 wherein the opening is a slot extending across the housing and having an open side through which the portion of the railing is slidingly received.

19. The attachment of claim 17 wherein the first and second pawls are independently movable.

20. The attachment of claim 17 wherein the first and second pawls are spaced apart a distance generally equal to or less than a spacing between two adjacent vertical railing portions.

21. The attachment of claim 17 wherein a distance between an outer edge of the first pawl to an outer edge of the second pawl is about 3.0 to 3.5 inches.

22. An article adapted to be releasably attached to a bed railing, said article comprising:

a housing defining an opening for receiving a portion of the railing, when the article is mounted on the railing;

a first pawl movably connected to the housing and arranged to be moved from a retaining position, in which the pawl is adapted to block the opening to prevent removal of the railing from the opening, to a release position retracted from the opening to enable removal of the article from the railing, the pawl having a surface arranged to extend between the portion of the railing and the opening side of the slot, to block removal of the railing from the opening with the pawl in its retaining position; and a spring connected to the housing and bearing against the pawl to bias the pawl towards its retaining position with respect to the housing such that when the article is slid over the bed railing, the pawl is moved by the spring to its retaining position;

wherein the opening is a slot extending across the housing and having an open side through which the portion of the railing is slidingly received and wherein the surface of the pawl defines a first step at a first distance from a distal closed side of the slot, and a second step at a second distance from the distal closed side of the slot, said second distance being greater than said first distance, for accommodating railings of different sizes.

23. The article of claim 22 wherein the first distance is about 1.425 inches.

24. The article of claim 22 wherein the second distance is about 2 inches.

25. The article of claim 22, further comprising a second pawl movably connected to the housing and spaced apart from the first pawl, the second pawl arranged to be moved from a retaining position in which the second pawl is adapted to block the opening to prevent removal of the railing from the opening, to a release position retracted from the opening to enable removal of the article from the railing.

26. The article of claim 25, wherein the first and second pawls are spaced apart a distance generally equal to or less than a spacing between two adjacent vertical crib railing portions.

27. The article of claim 4, wherein the first and second pawls are spaced apart a distance generally equal to or less than a spacing between two adjacent vertical crib railing portions.

* * * * *